US008670422B2

(12) United States Patent
Lewis et al.

(10) Patent No.: US 8,670,422 B2
(45) Date of Patent: Mar. 11, 2014

(54) SYSTEM AND METHOD FOR SENDING AND RECEIVING PACKETS (75) Inventors: Allan Lewis, New Dundee (CA); Jing Peng, Waterloo (CA); Bruno R. Preiss, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1647 days.

(21) Appl. No.: 11/741,810

(22) Filed: Apr. 30, 2007

(65) Prior Publication Data
US 2008/0267146 A1 Oct. 30, 2008

(51) Int. Cl.
*H04W 4/00* (2009.01)
(52) U.S. Cl.
USPC .......................... 370/338; 370/310; 370/469
(58) Field of Classification Search
USPC ............ 370/310, 328, 338, 395.52, 466, 467, 370/469
See application file for complete search history.

(56) References Cited

U.S. PATENT DOCUMENTS

| 7,151,764 | B1 | 12/2006 | Henonen et al. | |
|---|---|---|---|---|
| 7,620,015 | B2* | 11/2009 | Lenzarini | 370/331 |
| 2002/0035699 | A1* | 3/2002 | Crosbie | 713/201 |
| 2006/0015636 | A1 | 1/2006 | Skraba et al. | |
| 2006/0195551 | A1 | 8/2006 | Dowling | |
| 2007/0014281 | A1 | 1/2007 | Kant | |
| 2007/0041360 | A1 | 2/2007 | Gallagher et al. | |
| 2007/0058636 | A1 | 3/2007 | Cormier | |
| 2007/0072605 | A1* | 3/2007 | Poczo | 455/432.2 |

FOREIGN PATENT DOCUMENTS

WO 2006047862 A 5/2006

OTHER PUBLICATIONS

PCT International Search Report for PCT/CA2008/000775 Aug. 7, 2008.
PCT Written Opinion of the International Searching Authority for PCT/CA2008/000775 Aug. 6, 2008.
"Digital Cellular Telecommunications System (Phase 2+); Generic Access to the A/Gb Interface; Stage 2 (3GPP TS 43.318 version 6.0.0 Release 6); ETSI TS 143 318" ETSI Standards, European Telecommunications Standards Institute, Sophia-Antipo, FR, vol. 3-G1, No. V600, Jan. 2005, XP014028301 ISSN:0000-0001.

* cited by examiner

*Primary Examiner* — Wayne Cai
(74) *Attorney, Agent, or Firm* — Perry + Currier Inc.

(57) ABSTRACT

A system and method for sending and receiving packets is provided. An embodiment includes a system comprising a wireless communication device configured to communicate with at least one application server via device access node and a wireless local area network. The wireless communication device is configured to communicate with the device access node through the wireless local area network using at least one protocol layer that is native to the wireless local area network, and using at least one protocol layer that is native to the device access node. The device access node is configured to send and receive application information carried over above-described protocol layers.

18 Claims, 10 Drawing Sheets

SYSTEM AND METHOD FOR SENDING AND RECEIVING PACKETS

FIELD

The present disclosure relates generally to electronic communications and more particularly relates to a system and method for sending and receiving packets.

BACKGROUND

Wireless communication devices and wireless networks continue to proliferate. A number of different types of wireless communication networks exist and are contemplated. Examples of wireless networks include, but are not limited to, the Global System for Mobile communication ("GSM") (which includes General Packet Radio Service ("GPRS") and Enhanced Data rates for Global Evolution ("EDGE")), Code Division Multiple Access ("CDMA"), Wide-band CDMA ("WCDMA"), the Universal Mobile Telecommunications System ("UMTS"), the Institute of Electrical and Electronics Engineers ("IEEE") 802.16 standard ("WiMax"), the IEEE 802.11 standard and its variants ("WiFi"), and Bluetooth™.

With the proliferation of different types of wireless networks, so too does the demand for wireless communication devices that can communicate over those networks, including so called "hybrid" or "multi-mode" wireless communication devices that are capable of communicating over more than one type of wireless networks.

The Generic Access Network ("GAN"), also sometimes referred to as Unlicensed Mobile Access ("UMA"), has been proposed as a means to allow wireless communication devices that are primarily designed to communicate over wide area, cellular communication networks (e.g. GSM, GPRS, EDGE) to communicate over wireless local area networks ("WLAN") (e.g. WiFi, Bluetooth). See, for example, the whitepaper entitled, *Generic Access Network, GAN (Former UMA)*, Anonymous, October 2006, © Ericsson AB 2006 ("GAN Whitepaper"), the contents of which are incorporated herein by reference.

The GAN Whitepaper discloses a hybrid cellular telephone configured to communicate via GSM or via a WLAN. (See FIG. 2 of the GAN Whitepaper). However, one problem with GAN, as described in the GAN Whitepaper, is that as the hybrid cellular telephone uses the WLAN, traffic must be carried through a Generic Access Network Controller (GANC), which essentially mimics a traditional base station controller ("BSC"), so that the GANC will appear to be a BSC to the traditional core mobile network. This structure results in a large amount of additional overhead in order to carry the ultimate payload traffic, particularly between the hybrid cellular telephone and the GANC. The additional overhead can result in an effective reduction in bandwidth for the payload traffic. Perhaps more significantly, GAN can result in forcing data back through the carrier network and thereby increasing costs to the subscriber.

DETAILED DESCRIPTION OF THE EMBODIMENTS

An aspect of this specification provides a system for sending and receiving packets comprising a wireless communication device configured to communicate by sending and receiving packets over a wireless local area network. The system also comprises at least one device access node configured to communicate with the wireless communication device via the wireless local area network. The system also comprises an application server. The wireless communication device is configured to use at least one native network layer to communicate with the device access node. The at least one native network layer corresponds to protocol layers native to the wireless local area network. The wireless communication device is further configured to use at least one additional layer disposed above the at least one native network layer to communicate with the application server via the device access node. The at least one additional layer corresponds to protocol layers native to the device access node.

The wireless communication device can be further configured to communicate over a core mobile network. In this case the at least one device access node can be configured to communicate with the wireless communication device via either the wireless local area network or the core mobile network. The wireless communication device is further configured to use at least one additional native network layer. The at least one additional native network layer corresponds to layers native to the core mobile network.

The at least one native network layers can include an Internet protocol ("IP") layer and a transport control protocol ("TCP") layer. The at least one native network layers can further include a secure socket layer ("SSL") or datagram transport level security ("DTLS").

The system can further comprise a handler between the application server and the device access node.

Another aspect of this specification provides a method for sending and receiving packets comprising:

determining which of a plurality of radios in a wireless communication device is active; each of the radios configured for sending and receiving packets via different wireless links;

selecting at least one native network layer to communicate with a device access node; the at least one native network layer corresponding to one or more protocol layers that are native to the selected wireless link;

selecting at least one additional layer to communicate with an application server connected to the device access node and via the device access node; the at least one additional layer corresponding to one or more protocol layers that are native to the device access node; and, layering packets associated with an application on the application server above the selected at least one native network layer and the at least one additional layer.

In the method one of the wireless links can be a wireless local area network and a second one of the links can be a core mobile network.

Another aspect provides a wireless communication device comprising a radio for sending packets to at least one device access node over a wireless local area network. The wireless communication device can further comprise a processor connected to the radio and configured to select at least one native network layer; the at least one native network layer corresponding to at least one protocol layer that is native to the wireless local area network. The processor is further configured to select at least one additional layer that is native to the device access node. The processor is further configured to layer an application above the at least one native network layer and the at least one additional layer. The processor is further configured to send packets constructed according to the layers to the device access node. The application is typically destined for an application server connected to the device access node.

The wireless communication device can further comprise a second radio for sending packets to the at least one device access node over a core mobile network. The at least one device access node can be further configured to communicate with the wireless communication device via either the wireless local area network or the core mobile network. The wireless communication device and the at least one device access node can be further configured to use at least one additional native network layer. The at least one additional native network layer corresponding to protocol layers native to the core mobile network.

Figure 1:
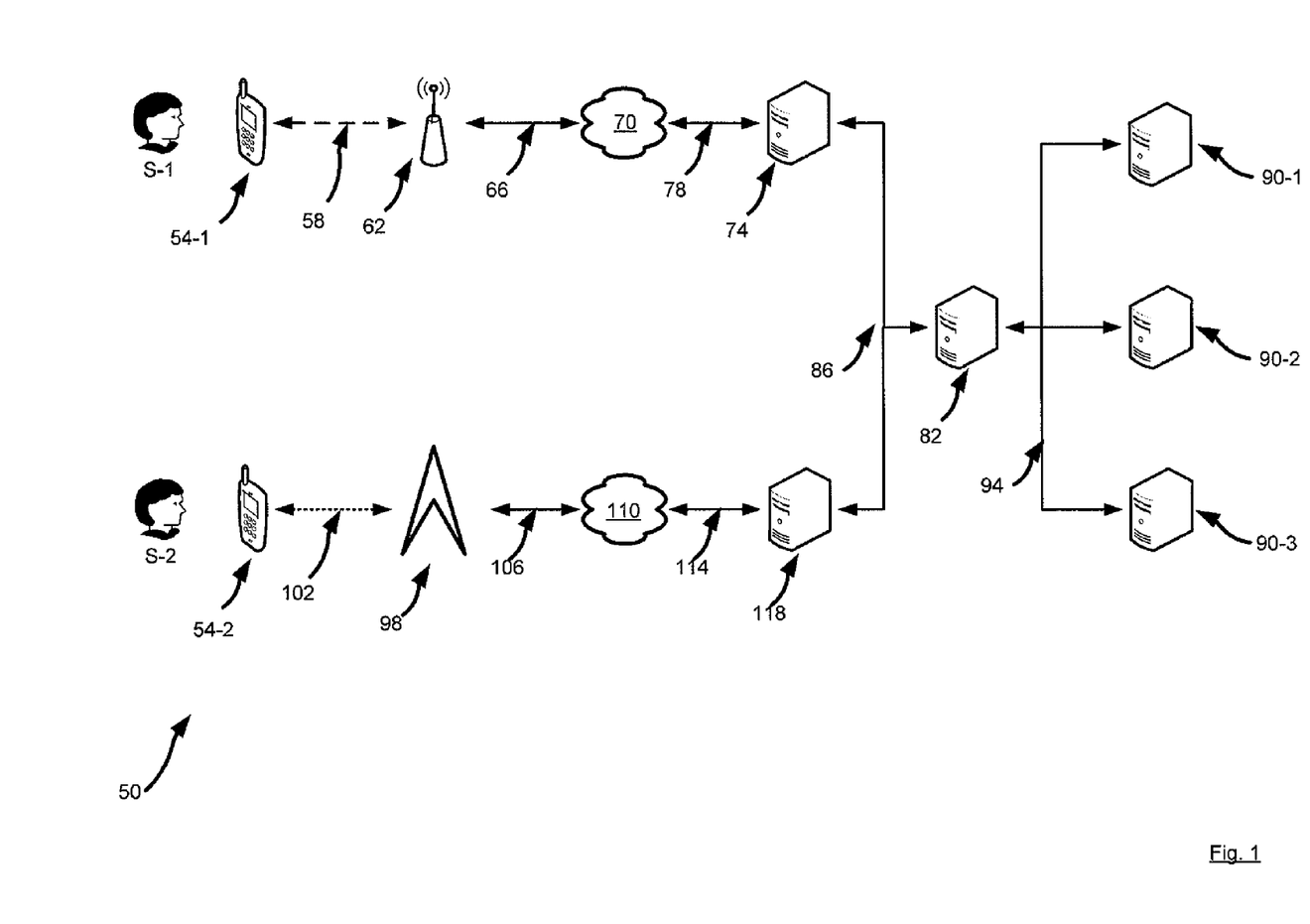
FIG. 1 is a schematic representation of a system for sending and receiving packets.

Referring now to FIG. 1, a system for sending and receiving packets is indicated generally at 50. System 50 comprises one or more wireless communication devices 54-1, 54-2 (collectively, wireless communication devices 54, and generically, wireless communication device 54. This nomenclature is used elsewhere herein). Each communication device 54-1, 54-2 is shown in FIG. 1 as being operated by a respective subscriber S-1, S-2.

In FIG. 1, device 54-1 is shown communicating with a WLAN access point 62 via a WLAN link 58. WLAN link 58 can be based on WiFi or Bluetooth or the like. In turn, WLAN access point 62 communicates over a link 66 with a data network which in the present embodiment is the Internet 70. Link 66 can be based on any known wireless or wired infrastructure, or combinations thereof. Exemplary wired infrastructures include Internet carried over Community Access Television ("CATV") coaxial cable, or Digital Subscriber Line ("DSL") or Ethernet. Those skilled in the art will now recognize that the components between access point 62 and Internet 70 reflect a typical "WiFi" infrastructure commonly deployed in a residence or as a so-called "WiFi hotspot" in a place of business.

System 50 also includes at least one device access node 74 that also connects to Internet 70 via a link 78. Like link 66, link 78 can be based on any known wireless or wired infrastructure. While not shown, appropriate firewalls can also be included in transport node 74 to protect it from malicious traffic via Internet 70.

Throughout this specification, a number of different types of servers are described. Each such server can be based on any desired computing environment consisting of any combination of hardware, firmware, operating systems and software. Exemplary servers include any of the servers offered under the Sun Fire™ product line from Sun Microsystems, Inc., 4150 Network Circle, Santa Clara, Calif. 95054 USA, or any other computing environment comprising one or more central processing units interconnecting random access memory (or other volatile storage), read only memory (or other non-volatile storage), hard discs (or other persistent storage), network interfaces, input device and output devices via a bus.

While FIG. 1 shows only one device access node 74, it should be understood that WiFi device access node 74 can in fact be implemented as a plurality or cluster of device access nodes 74. Alternatively, only a single device access node 74 may be provided, but a plurality of "virtual servers" can be run on that single node 74, by using multi-threading or similar programming techniques. Alternatively, multiple transport nodes 74 can be provided, each of which run multiple threads. A load balancer (not shown) can be provided in these alternative situations. Such alternative situations can be desired where a plurality of access points like access point 62 and/or a plurality of devices 54 that are connected to access point(s) 62 are provided and all of which connect to device access node(s) 74.

WiFi device access node 74, in turn, communicates with at least one service access handler 82. Traffic between node 74 and service access handler 82 is carried via a link 86. Like link 78, link 86 can be based on any known wireless or wired infrastructure and/or link 86 can be based on Internet 70 itself, and/or combinations thereof. As will be explained in greater detail below, link 86 carries traffic in User Datagram Protocol ("UDP")/Internet Protocol ("IP"), although this is a non-limiting example.

Also like node 74, service access handler 82 can in fact be implemented as a plurality or cluster of service access handlers 82 and/or multi-threading can be employed, particularly where the volume of traffic so warrants.

Service access handler 82, in turn, communicates with a plurality of application servers 90-1, 90-2, 90-3. Each application server 90 hosts a service can be accessed by subscribers S via devices 54. Service access handler 82 connects to servers 90 via link 94. Link 94, like link 86, can be based on any known wireless or wired infrastructure, including the Internet. Thus, servers 90 can themselves be, for example, web servers that host web sites that subscribers S wish to browse via their respective devices 54. However, this is merely an example. Servers 90 can in fact host any type of application or service, whether or not based on the Internet. An exemplary and non-limiting list of services includes e-mail, instant messaging, web browsing, file transfers and content distribution.

FIG. 1 also shows device 54-2 in communication with a wireless base station 98 via cellular link 102. Base station 98 and cellular link 102 can be based on GPRS, CDMA, UMTS or the like. In turn, base station 86 communicates over a link 106 with the core mobile network 110. Where link 102 is based on GPRS, then core mobile network 110 can include, for example, one or more home location registers ("HLR"), mobile switching centers ("MSC"), Gateway GPRS Support Nodes ("GGSN"), and Service GPRS Support Node ("SGSN"). Link 106 can be based on any known wireless or wired infrastructure, or combinations thereof, but is typically a backhaul such as a T1, T3, OC3 or the like.

In turn, core mobile network 110 connects to a cellular device access node 118 via link 114. In a present embodiment link 114 uses standard Internet Protocol ("IP") routing techniques, using a frame-relay based leased line over which IP traffic is routed from the infrastructure of core mobile network 110 to server 118. In other embodiments, link 114 can be a dedicated link that is not reliant on IP routing techniques. While not shown, appropriate firewalls can also be included in transport server 118 to protect it from malicious traffic via core network 110. In turn, device access node 118 connects to service access handler 82 via link 86. In a present embodiment, device access node 118 is functionally equivalent to device access nodes that are presently deployed in networks based on the Relay infrastructure from Research in Motion Inc. Waterloo, Ontario, to provide support for data services for Blackberry™ devices. However, server 118 can be based on other infrastructures, such as the Networks Operations Center ("NOC") from Visto Corporation, 101 Redwood Shores Parkway, Suite 400, Redwood City, Calif. 94065. Server 118 can also be implemented in clusters and/or via multi-threading as desired.

However, those skilled in the art should also now recognize that, in general, the components between base station 98 and servers 90 need not be based on infrastructure specific to Research in Motion and that components between base station 98 and servers 90 can also be based on infrastructures such as the GSM/WCDMA Radio Access Networks (RAN) as shown in FIG. 1 and FIG. 2 of the GAN Whitepaper, or based on the NOC infrastructure from Server 118 can be based on other infrastructures, such as the Networks Operations Center ("NOC") from Visto Corporation.

As will be explained in greater detail below, WLAN device access node 74 provides substantially the same functionality as cellular device access node 118 in that traffic carried via link 86 between node 74 and service access handler 82 is substantially the same format and protocol as the traffic carried between server 118 and service access handler 82. However, WLAN node 74 is configured for traffic carried via access point 62, whereas server 118 is configured for traffic carried via base station 98. Put in other words, WLAN device access node 74 carries data on behalf of devices 54 that access servers 90 via WLAN infrastructure, whereas cellular device access node 118 carries traffic on behalf of devices 54 that access servers 89 via cellular infrastructure. Also, the functionality provided by one or more of node 74, server 118 and service access handler 82 can be implemented in a single server, or clusters of servers, as desired.

Figure 2:
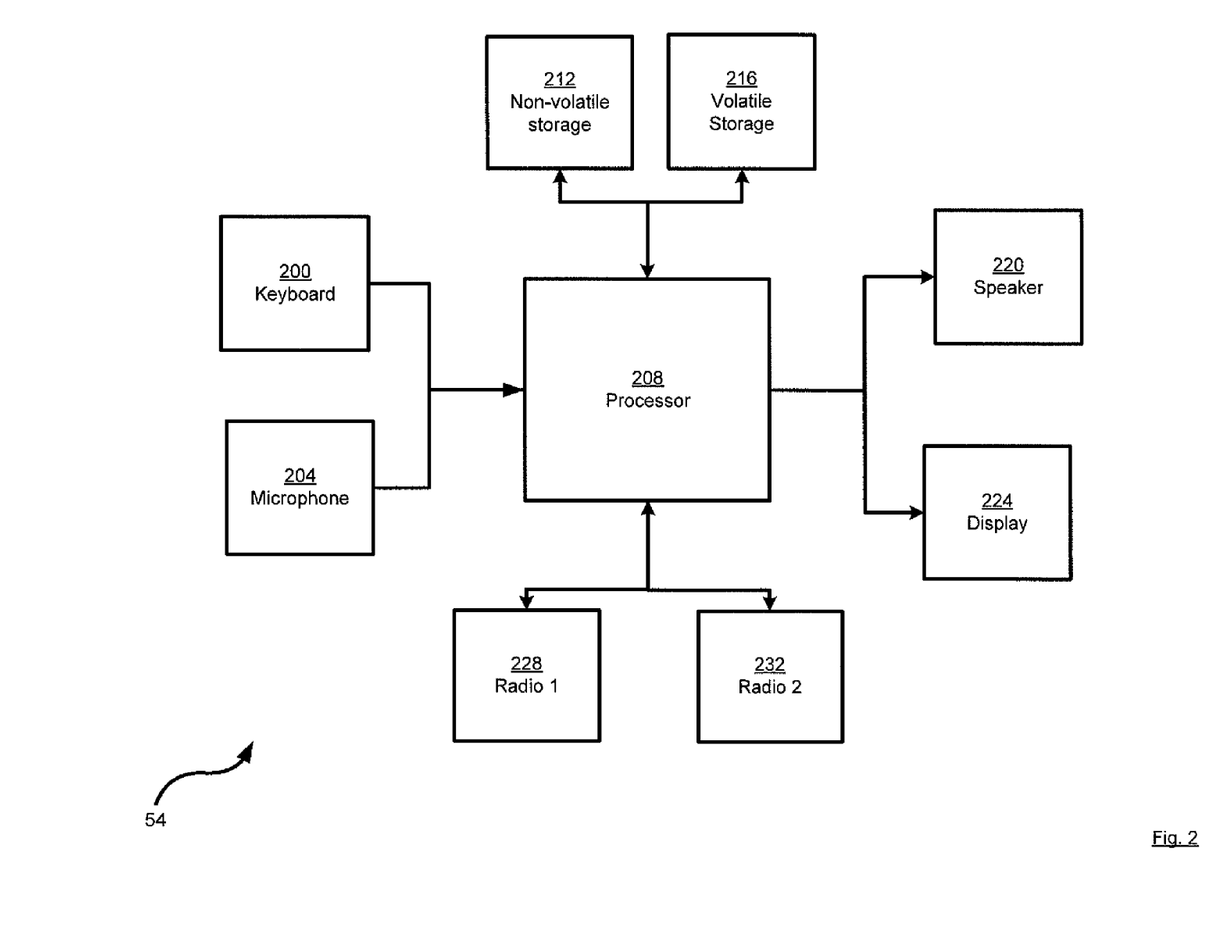
FIG. 2 is a schematic representation of a wireless communication device from FIG. 1.

Referring now to FIG. 2, a schematic block diagram of device 54 is shown. It should be emphasized that the structure in FIG. 2 is purely exemplary, and contemplates a device that be used for both wireless voice (e.g. telephony) and wireless data (e.g. email, web browsing, text) communications. Device 54 includes a plurality of input devices which in a present embodiment includes a keyboard 200 and a microphone 204. Other input devices, such as a trackwheel, trackball, touch screen, and camera lens are also contemplated. Input from keyboard 200 and microphone 204 is received at a processor 208, which in turn communicates with a non-volatile storage unit 212 (e.g. read only memory ("ROM"), Erasable Electronic Programmable Read Only Memory ("EEPROM"), Flash Memory) and a volatile storage unit 216 (e.g. random access memory ("RAM"). Programming instructions that implement the functional teachings of device 54 as described herein are typically maintained, persistently, in non-volatile storage unit 212 and used by processor 208 which makes appropriate utilization of volatile storage 216 during the execution of such programming instructions.

Processor 208 in turn is also configured to send output to a speaker 220 and a display 224. Processor 208 also contains a first radio 228 and a second radio 232. First radio 228 is configured for communication via link 58, while second radio 232 is configured for communication via link 102. Thus, in a present embodiment each device 54 is a hybrid device that can communicate over link 58 and/or over link 102. However, in other embodiments, it is contemplated that second radio 232 can be omitted from device 54 so that device 54 can only communicate via link 58.

Figure 3:
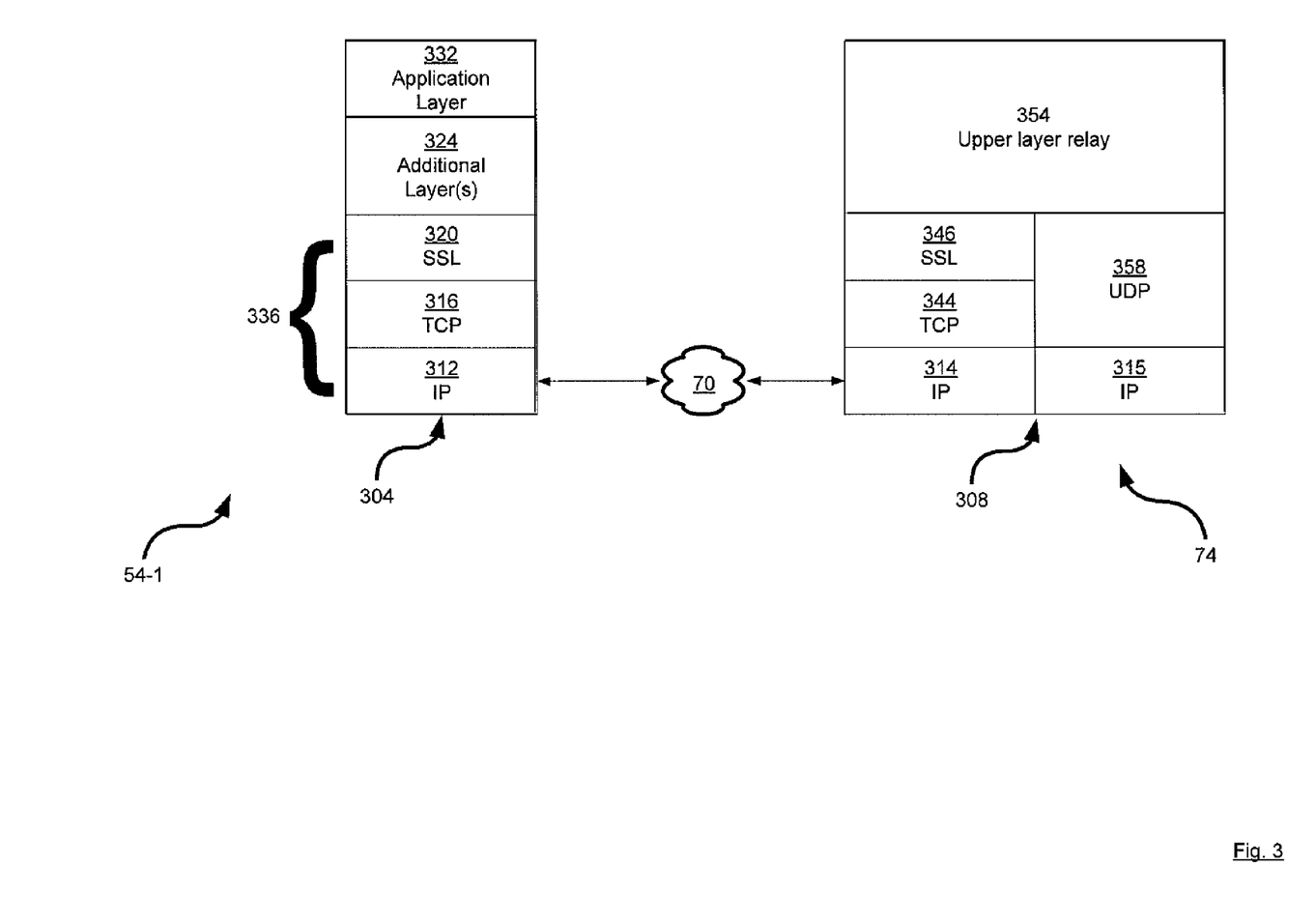
FIG. 3 is a schematic representation of a protocol stack that can be used in the system of FIG. 1.

FIG. 3 shows a protocol stack 304 that can be employed by device 54-1 and a pair of protocol stacks 308 that can be employed by node 74. The left side of stacks 308 (i.e. the protocol stack on the left side of stacks 308) reflects a first protocol stack for communications between device 54-1 and node 74 via Internet 70 according to the system in FIG. 1. The right side of stacks 308 (i.e. the protocol stack on the right side of stacks 308) reflects a second protocol stack for communications between node 74 and handler 82. In operation, messages flow up the left side of protocol stacks 308 and down the right side of protocol stacks 308. (This nomenclature and structure of for protocol stack(s) is used elsewhere herein). Device 54-1 and node 74 are thus configured to utilize stack 304 and stacks 308 respectively.

Stack 304 thus comprises an Internet Protocol ("IP") layer 312; a transport control protocol ("TCP") layer 316; a secure socket layer ("SSL") 320; at least one additional layer 324 and an application layer 332.

IP layer 312, TCP layer 316 and SSL 320 are all non-proprietary protocols that are inherent to Internet 70, and thus those skilled in the art that will now recognize that collectively, IP layer 312, TCP layer 316 and SSL 320 comprise at least one native network layer 336, which is native and/or specific to Internet 70. Thus, layers 312, 316 and 320 can be implemented using any one or more protocol layers that are native to Internet 70, or native to any other type of network that is used instead of Internet 70.

The at least one additional layer 324, which is actually optional and can be omitted altogether depending on how node 74 and/or handler 82 are implemented, is one or more protocol layers that may be proprietary and/or specific to node 74 and/or handler 82. The at least one additional layer 324 can be presentation and/or session layers. The at least one additional layer 324 can be implemented in accordance with any proprietary layers and or other layers that may be relevant to infrastructures that provide similar functionality to node 74 and/or handler 82, and/or any other components between Internet 70 and servers 90, or even servers 90 themselves. The at least one additional layer 324 can, though need not be, substantially the same as similar layer(s) used to implement server 118, to thereby allow harmonization of the at least one additional layers used by both node 74 and server 118.

Application layer 332 contains data corresponding to the relevant application being accessed by device 54-1 on application server 90.

Those skilled in the art will now recognize that node 74 is (or node 74 and handler 82 collectively are) configured to communicate with device 54 in accordance with at least one additional layer(s) 324, either as exactly shown or in accordance with variations thereof that can be effected as previously discussed. In a present embodiment, node 74 is configured to operate using stacks 308. The left side of stacks 308 comprises an IP layer 314 complementary to IP layer 312; a TCP layer 344 complementary to TCP layer 316; and an SSL 346 complementary to SSL 320. Layers 312, 344 and 346 are thus, collectively, directly complementary to at least one native network layer 336.

Stacks 308 also comprise an upper layer relay 354, which passes the at least one additional layer(s) 324 and application layer 332 on to handler 82, making use of any additional point-to-point proprietary protocols needed to effect such passing. Upper layer 354 is thus common to both the left and right halves of stacks 308. Upper layer relay 354 is effectively the messages carried through node 74, such messages comprised of at least one additional layer 324 and application layer 332, which is routed through node 74 and/or handler 82 so that application layer 332 can ultimately be delivered to the appropriate server 90.

In FIG. 3, the right side of stacks 308 reflect protocol layers that are complementary to handler 82 and used for communication with handler 82 via link 86. Thus, in a present embodiment, IP Layer 314, TCP layer 344 and SSL 346 are replaced, in a present embodiment, by node 74 with an IP Layer 315 and a User Datagram Protocol ("UDP") layer 358. Note, however, that UDP layer 358 is also a network layer that is native to Internet 70. In effect, node 74 is configured to manage the SSL and remove the SSL on behalf of the handler 82. Thus, in another embodiment, UDP layer 358 could be replaced by a TCP layer.

Figure 4:
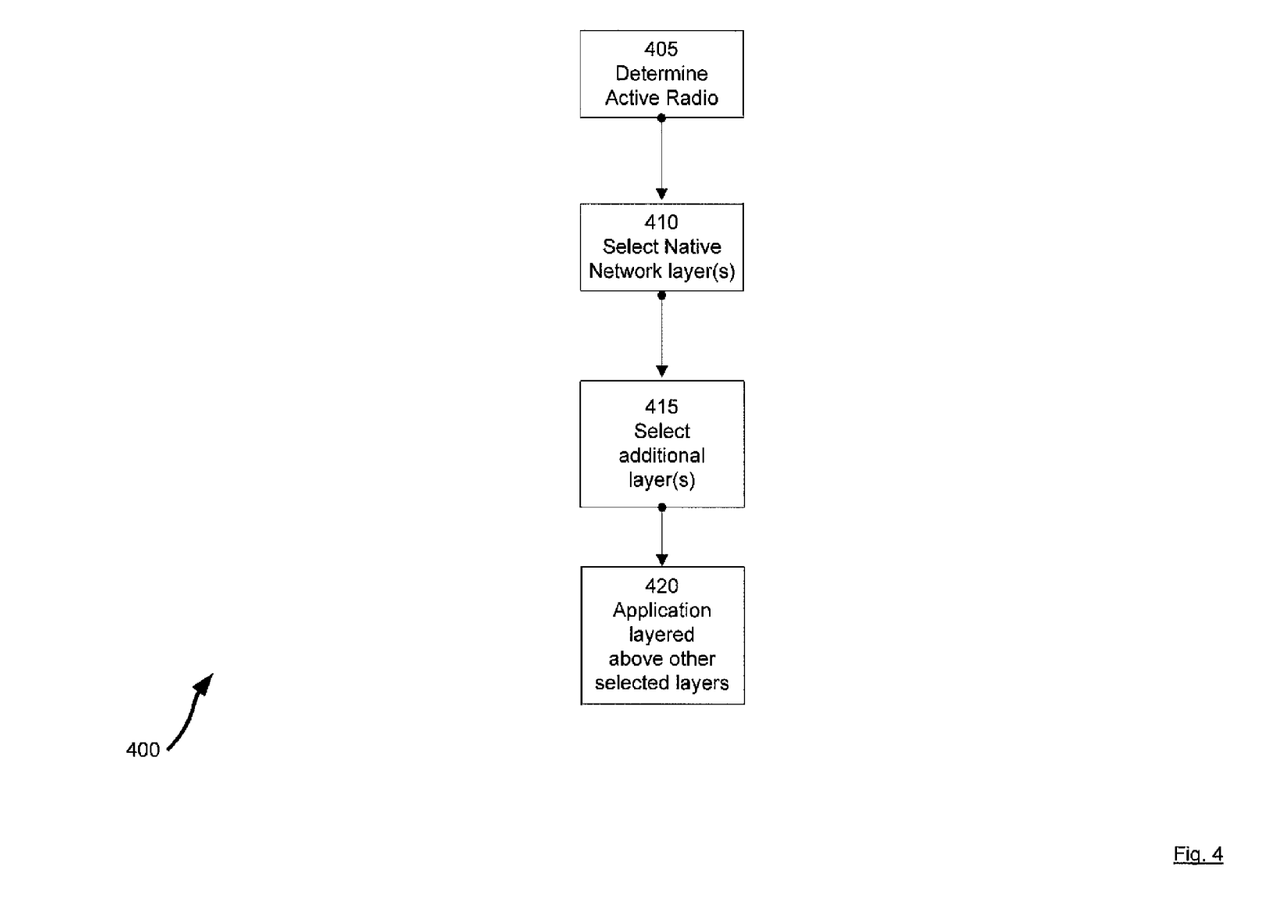
FIG. 4 shows a flowchart depicting a method for sending and receiving packets.

Referring now to FIG. 4, a method for sending and receiving packets represented in the form of a flow chart is indicated generally at 400. To assist in explaining the method, and to assist in further explaining system 50, method 400 will be explained in relation to its performance on system 50. However, it is to be understood that method 400 can be performed on systems different than system 50, and likewise that system 50 can be operated differently.

Method 400 in a present embodiment is performed by either device 54-1 or device 54-2. For the purposes of the present explanation, it will be assumed that method 400 is performed using device 54-1. Beginning first at step 405, a determination is made as to which radio is active. When performed by device 54-1, processor 208 will determine that first radio 228 is active and therefore will determine that device 54-1 is using wireless link 58 which is based on WiFi. Typically, device 54-1 detects the presence of WiFi and/or cellular signals, perhaps measuring the strength of those signals, and then according to a pre-defined policy, processor 208 will select one of them to use. In a present embodiment only one is used at a time, but it should be understood that in other embodiments that simultaneous use of radios 228 and 232 is contemplated.

Next, at step 410, native network layer(s) are selected. In a generic situation, regardless of the specific implementation in system 50, step 410 can be implemented by the device selecting native network layer(s) 336. The device will select the protocol layers that are native the network that will be used to connect device 54 with node 74. In a present embodiment, device 54-1 will select IP layer 312, TCP layer 316, and SSL 320.

Next at step 415, at least one additional layer is selected. In a generic situation, regardless of the specific implementation in system 50, step 415 can be implemented by the device selecting at least one additional layer 324. The device will select layers that correspond to the data infrastructure that is native to communications between device 54 and node 74 and/or handler 82 and/or servers 90. (However, it should be noted that, in cases where at least one additional layer 324 is omitted, then likewise step 415 can be omitted in certain implementations, where at least one additional layer is simply not required).

Next, at step 420, the application is layered above the layers selected at step 410 and step 415. Thus, application layer 332 is created and placed above the preceding layers. The result of performance of method 400, according to this specific example, is the implementation of protocol stack 304 in order to route packets to node 74, and ultimately to allow device 54-1 to access application server(s) 90.

Those skilled in the art will recognize that method 400 can also be performed by device 54-2 in order to route packets to server 118, and ultimately to allow device 54-2 to access application server(s) 90. However, in a present embodiment, device 54-2 will select, at step 410, native network layers that are native to the core mobile network 110, but will also select, at step 415, at least one additional layer that complement communications with server 118—which can in fact be the same as at least one additional layer 324.

Figure 5:
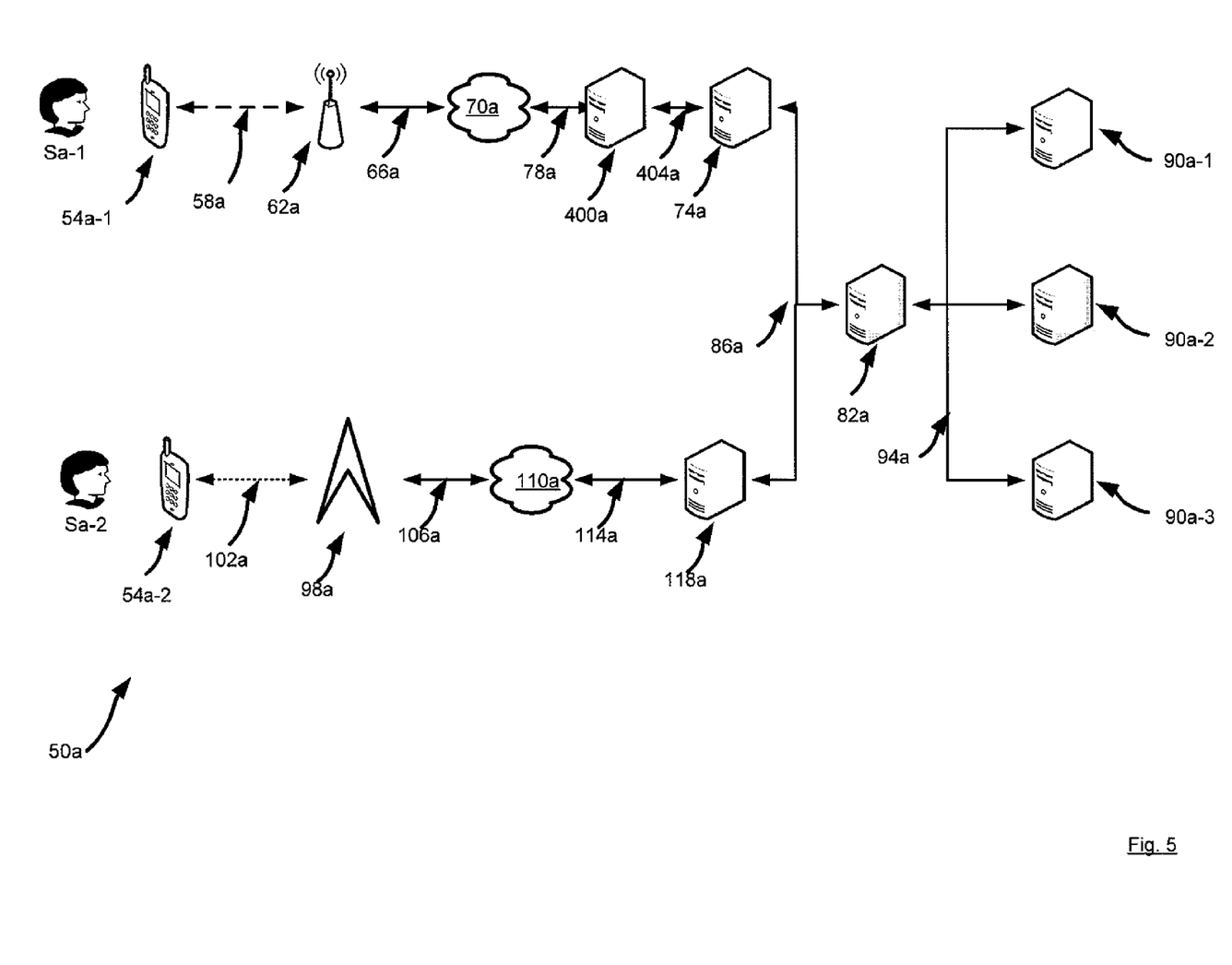
FIG. 5 is a schematic representation of another system for sending and receiving packets.

As previously mentioned, variations on system 50 are contemplated, and likewise method 400 can be performed on such varied systems. As but one example, FIG. 5 shows a modified version of system 50 labeled as system 50a. The majority of system 50a includes elements that are substantially the same as the elements of system 50, and like elements are provided with like references, except followed by the suffix "a". However, of note is that in system 50a, an SSL accelerator server 400a is included between node 74a and Internet 70a.

SSL accelerator server 400a and node 74a (as well as servers 118 and handler 82a) can, if desired, be implemented on a single server or other piece of hardware. Regardless of how implemented, server 400a is configured to reduce, in comparison to node 74 of system 50, the effort required to manage SSL 320 and thereby increase the operating speed and/or efficiency of node 74a in comparison to node 74.

Figure 6:
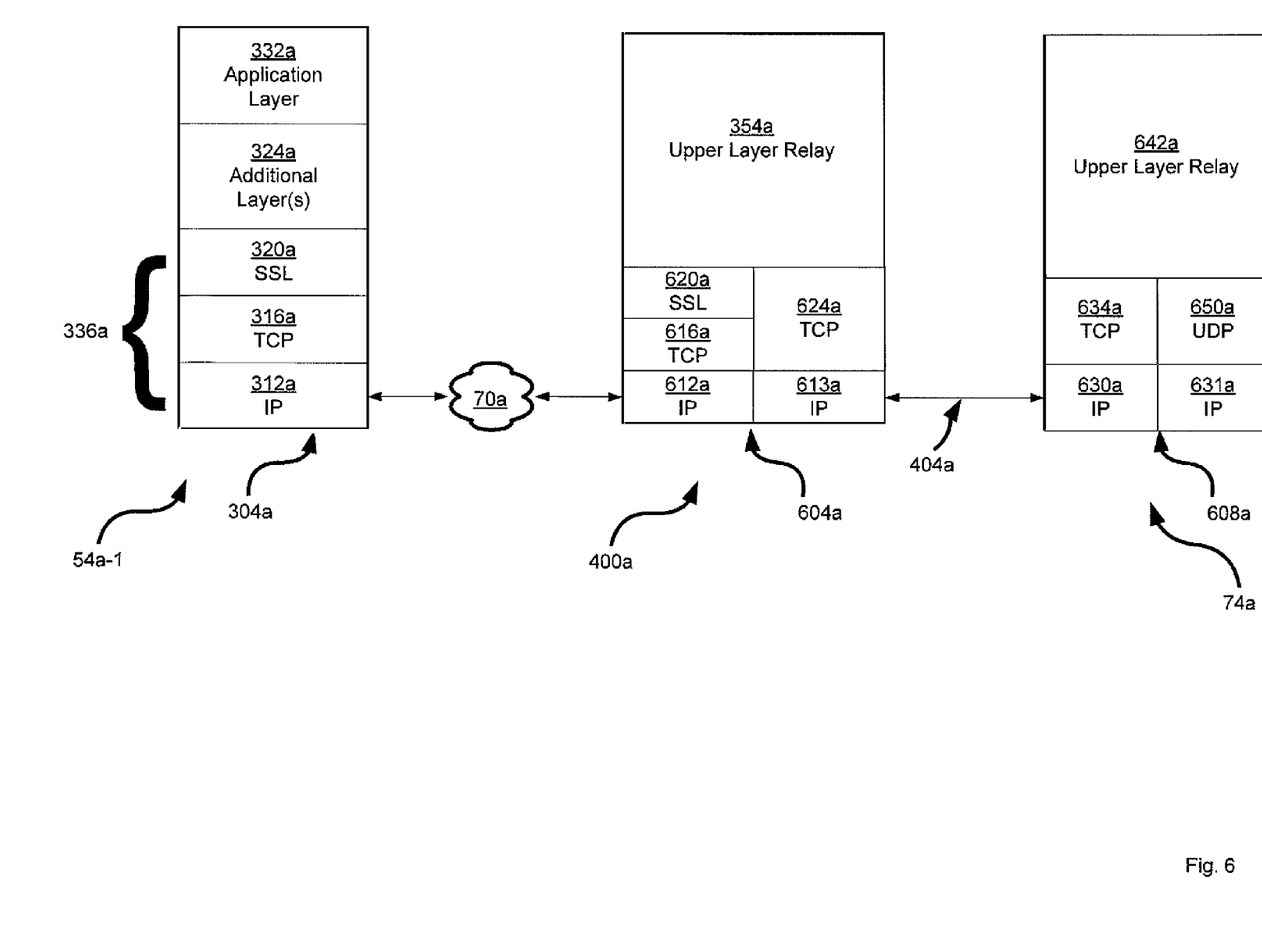
FIG. 6 is a schematic representation of a protocol stack that can be used in the system of FIG. 5.

FIG. 6 shows a protocol stack 304a that can be employed by device 54a-1 and a pair of protocol stacks 608a that can be employed by node 74a, and a pair of protocol stacks 604a that can be employed by SSL accelerator 400a.

Stack 304a is, in a present embodiment, substantially the same as stack 304 and accordingly no further explanation of stack 304a is needed. Again, of note is that at least one additional layer(s) 324a can be optional depending on the protocols used to implement node 74a and/or handler 82a.

The left side of stacks 604a comprises an IP layer 612a, a TCP layer 616a and an SSL 620a, again all of which are all native protocols of Internet 70. The right side of stacks 604a also comprises an IP layer 613a and a TCP layer 624a for communications via link 404a. Stacks 604a also includes a upper layer relay 354a which passes at least one additional layer(s) 324a and application layer 332a from the left side of stacks 604a to the right side of stacks 604a.

Thus, stacks 604a are configured to manage SSL 620a and thereby present stack 304a to device 74a without inclusion of SSL 620a.

Accordingly, stacks 608a are simpler than stacks 308a, without the presence of SSL 346. Otherwise stacks 608a are substantially the same as stacks 308a. The left side of stacks 608a include IP layer 630a which is substantially the same as IP layer 314 and TCP layer 634a which is substantially the same as TCP layer 344. Stacks 608a also include an upper layer relay 642a which performs substantially the same function as upper layer relay 354a. Likewise the right side of stacks 608a also include IP layer 631a which is substantially the same as IP layer 315 and UDP layer 650a which is substantially the same as UDP layer 358.

Figure 7:
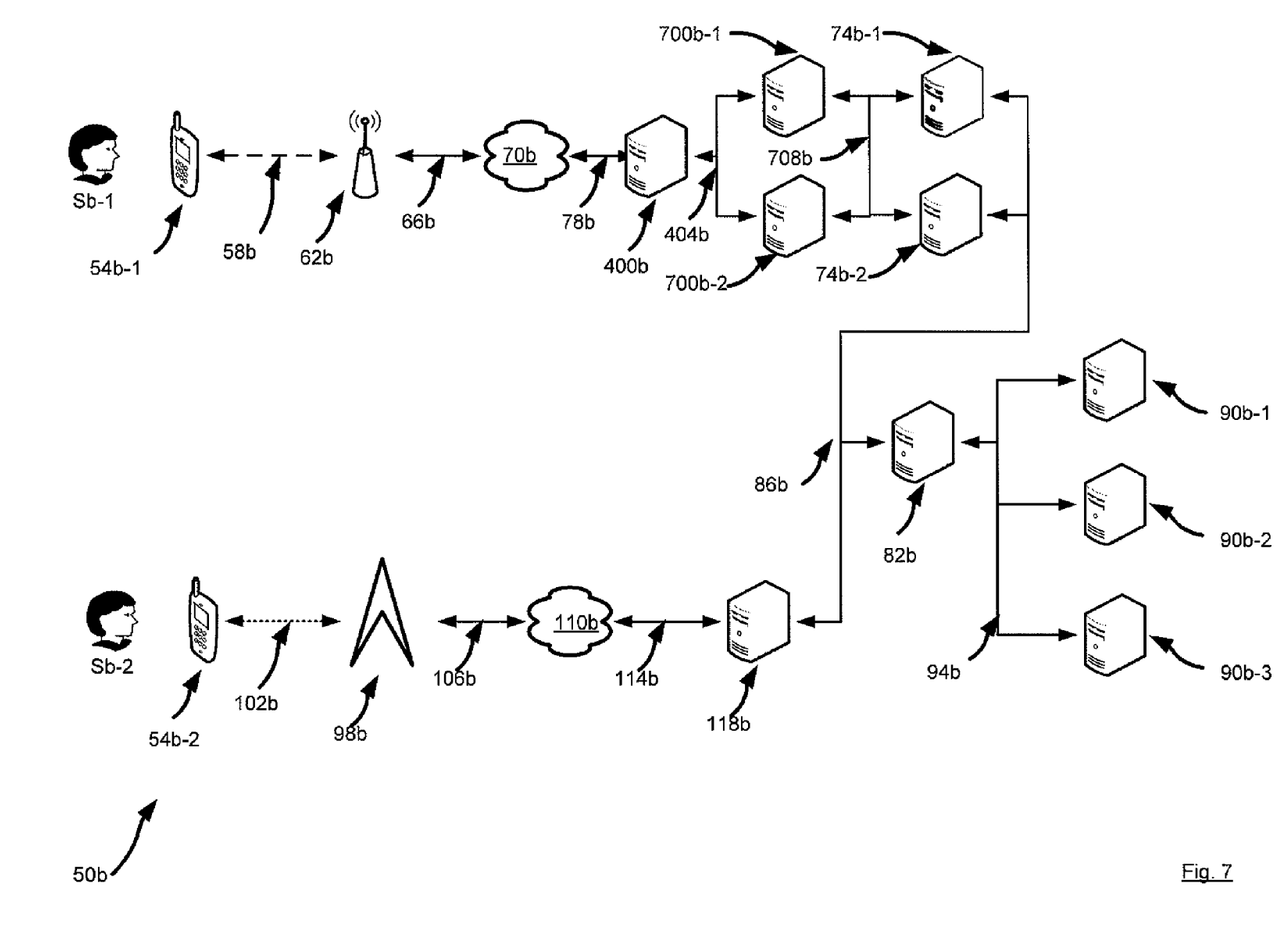
FIG. 7 is a schematic representation of another system for sending and receiving packets.

FIG. 7 shows a modified version of system 50a labeled as system 50b. The majority of system 50b includes elements that are substantially the same as the elements of system 50a, and like elements are provided with like references, except followed by the suffix "b". However, of note is that in system 50b, a plurality of TCP aggregator servers 700b are included between a plurality of nodes 74b and SSL accelerator 400b. Servers 700b-1 and 700b-2 are both connected via link 708b to nodes 74b-1 and node 74b-2, so that either of servers 700b-1 or 700b-2 can deliver traffic to either node 74b-1 and node 74b-2.

It is to be emphasized, again, that the clustering of aggregator servers 700b and nodes 74b, as shown, is exemplary. Clustering could also be achieved via multiple threads executing on a single server. A plurality of servers and/or multi-threads is not necessary but can be desired depending on the amount of traffic from one or more devices 54 that may be attempting to access servers 90b via Internet 70b. Regardless of how implemented, server 700b is configured to reduce, in comparison to node 74a of system 50a, the effort required to manage TCP layer 624a, by terminating the connection for TCP layer 316a at server 700b, and thereby increase the operating speed and/or efficiency of node 74a in comparison to node 74.

While not shown, load balancers can also be deployed to equalize flow of traffic to various components.

Figure 8:
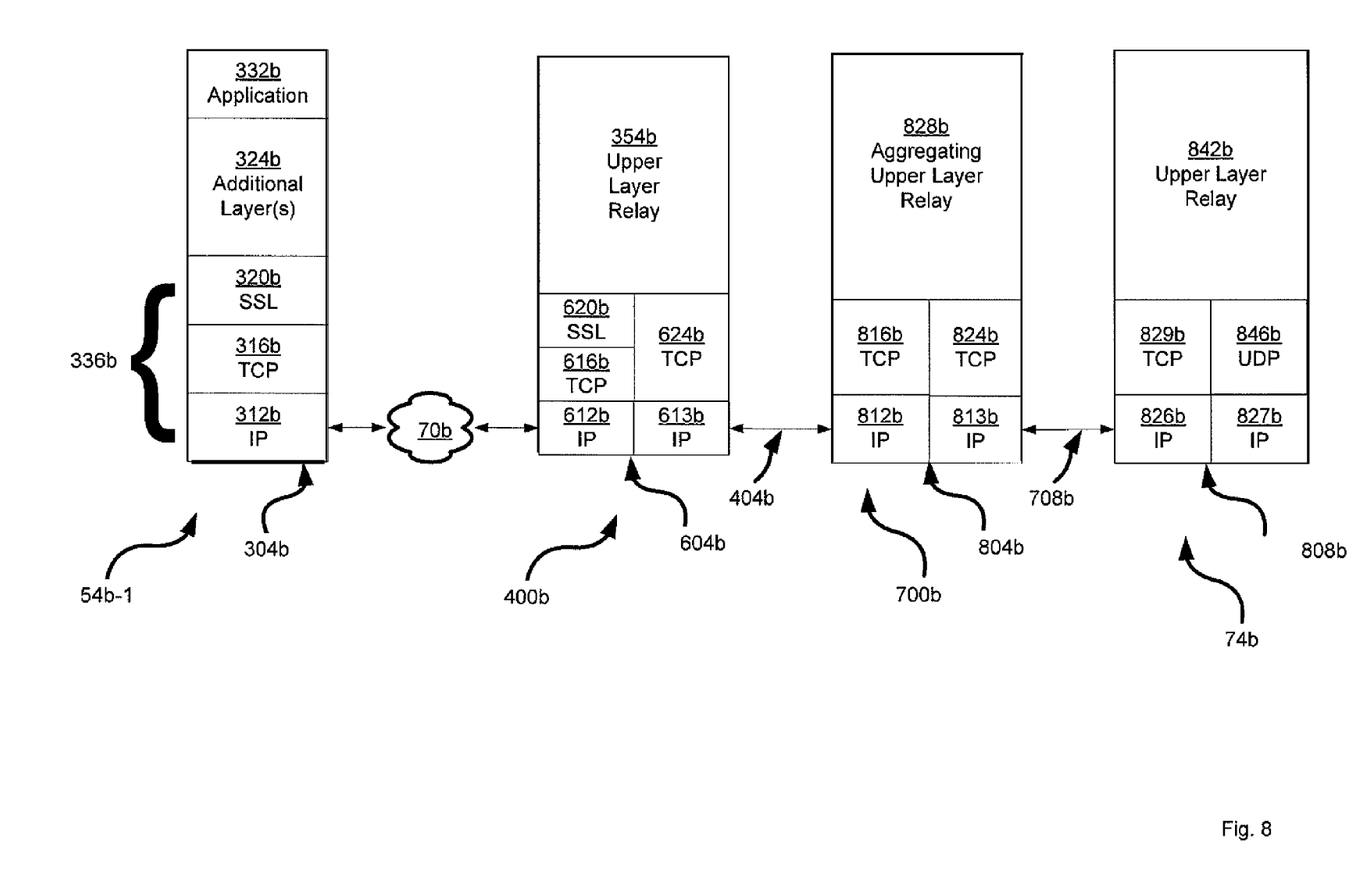
FIG. 8 is a schematic representation of a protocol stack that can be used in the system of FIG. 7.

FIG. 8 shows a protocol stack 304b that can be employed by device 54b-1 and a pair of protocol stacks 808b that can be employed by node 74b, and a pair protocol stacks 604b that can be employed by SSL accelerator 400b, and a pair of protocol stacks 804b that can be employed by TCP aggregator servers 700b.

Stack 304b is, in a present embodiment, substantially the same as stack 304a and accordingly no further explanation of stack 304b is needed.

Stacks 604b are, in a present embodiment, substantially the same as stacks 604a and accordingly no further explanation of stacks 604b are needed.

The left side of stacks 804b comprises an IP layer 812a complementary to IP layer 613b, and a TCP layer 816a complementary to TCP layer 624b. The right side of stacks 804b also includes a TCP layer 824b and an IP layer 813b for communications between servers 700b and nodes 74b. Stacks 804b also include an aggregating upper layer relay 828b that collects packets from upper layer relay 354b and is used to distribute the processing of the protocol layers from upper layer relay 354b, thereby permitting the contact point at which traffic from devices 54b terminates to be separated from the device that access nodes 74b, and thereby reduce the total number of TCP connections managed by servers 700b. Overall, aggregating upper layer relay 828b can allow extra flexibility in the routing options in deploying the architecture.

Thus, stacks 804b are configured to manage TCP layer 624b and thereby present messages from stack 304b to nodes 74b, so that nodes 74b do not have to manage TCP layer 316b or TCP layer 624b, effectively allowing the TCP connection from device 54b to be terminated at TCP aggregator server 700b.

Stacks 808b can permit nodes 74b to operate more efficiently, in that while stacks 808b do include a TCP layer 829b, TCP layer 829b need not manage connections of TCP layers 316b originating from devices 54b, but need only manage connections from TCP aggregator servers 700b. Stacks 808b also include IP layer 826b which is complementary to IP layer 812b. Stacks 808b also include an upper layer relay 842b to manage traffic from aggregating upper layer relay 828b. Stacks also include UDP layer 846b that is substantially the same as UDP layer 650a and an IP layer 827b that is substantially the same as IP layer 631a.

System 50b can provide better modularity, since the TCP connection from device 54b is terminated at TCP aggregator server(s) 700b. Likewise, the complexity and workload of node 74b is reduced. The TCP aggregator server(s) 700b can be optimized and/or modified without interrupting services provided by node 74b, thereby providing improved efficiency and scalability. Such modifications can be made in a manner that is transparent to handler 82b.

Also, the TCP aggregator server 700b can provide extra flexibility in test and deployment, as static routing from device 54b-1 can be implemented on the TCP aggregator server 700b, and test components can be connected to handler 82b. Also, since node 74b is typically closely tied to handler 82b, and needs to be accessed conveniently by handler 82, yet the TCP aggregator server 700b can be deployed almost anywhere.

System 50b can also offer better load balancing capability, in that more sophisticated load balancing mechanisms can be implemented prior to TCP aggregator servers 700b than can be deployed prior to nodes 74, 74a or 74b.

Where system 50b is deployed, it can also be desired, in handoff scenarios, to provide that nodes 74b can inform TCP aggregator server 700b to close the TCP connection with device 54b-1 in the event device 54b-1 switches to the cellular network and starts communicating over link 102b with base station 98b and continues to access one or more of servers 90b.

It can also be desired vary system 50b so that a plurality of TCP aggregator servers 700b are dedicated to a single node 74b instead of the many-to-many relationship shown in FIG. 7.

Figure 9:
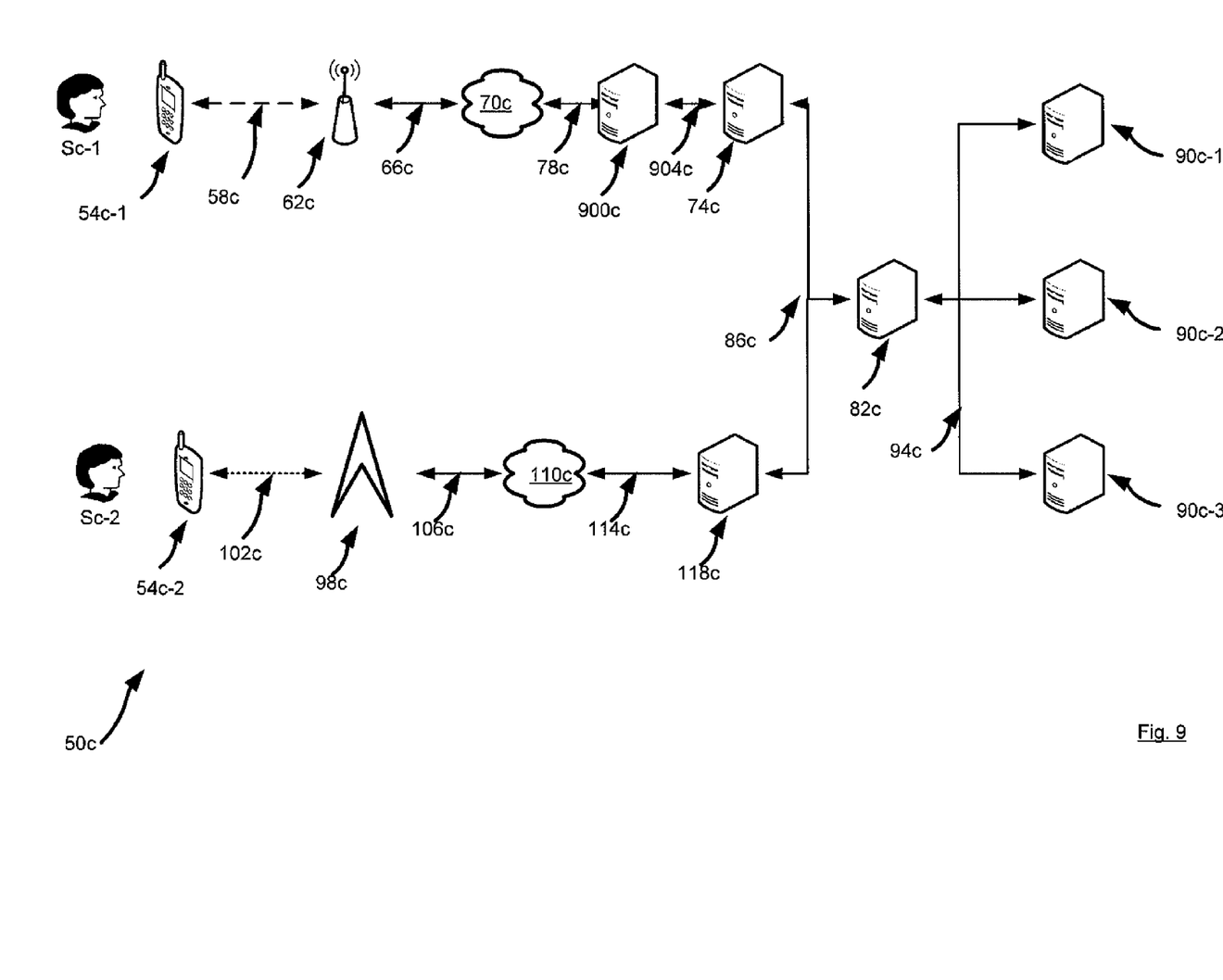
FIG. 9 is a schematic representation of another system for sending and receiving packets.

FIG. 9 shows a modified version of system 50 labeled as system 50c. The majority of system 50c includes elements that are substantially the same as the elements of system 50, and like elements are provided with like references, except followed by the suffix "c". However, of note is that in system 50c, a network interface adapter server 900c is included between node 74c and Internet 70c.

Figure 10:
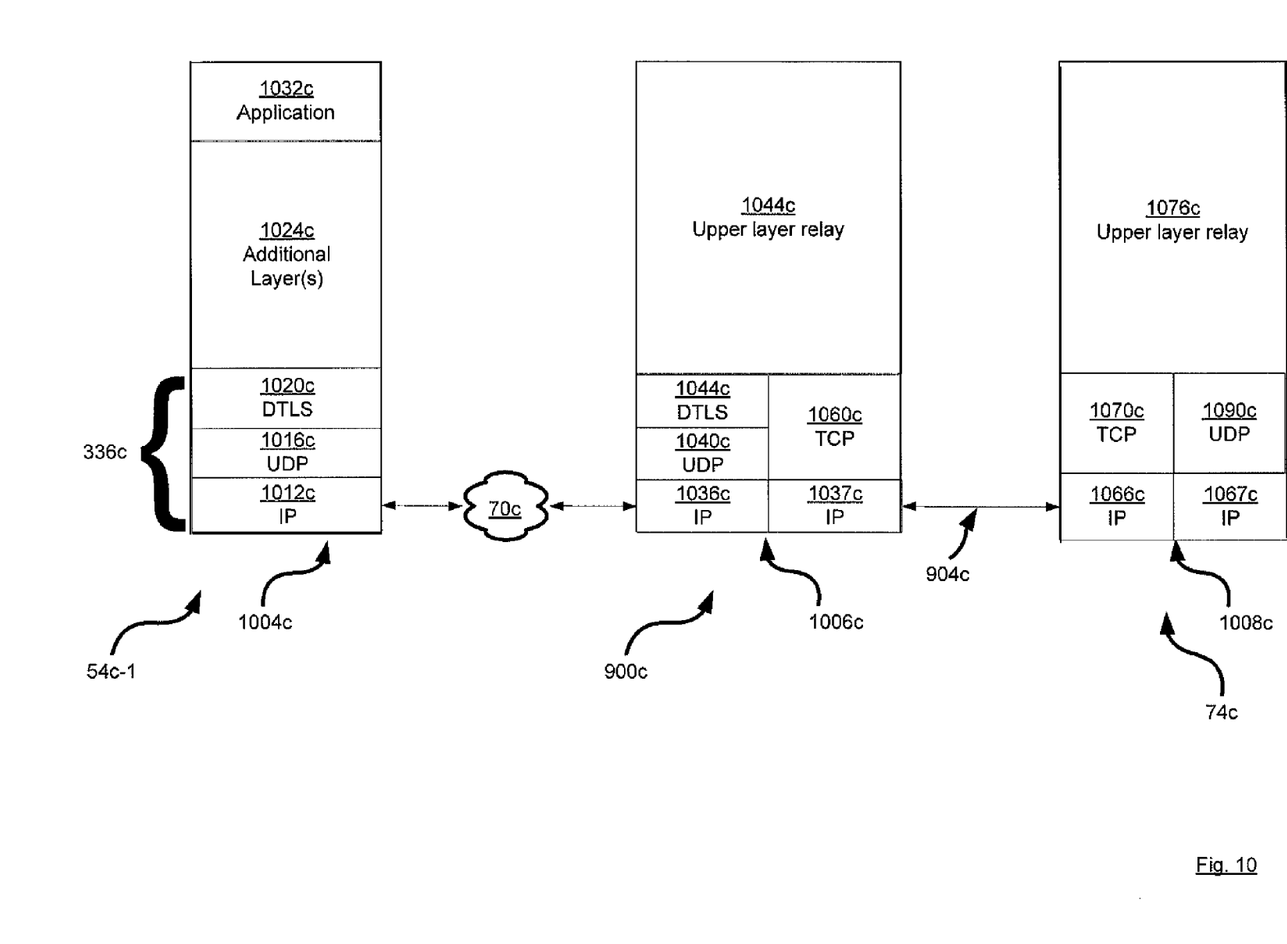
FIG. 10 is a schematic representation of a protocol stack that can be used in the system of FIG. 7.

Server 900c and node 74c (as well as servers 118c and handler 82c) can, if desired, be implemented on a single server or other piece of hardware. FIG. 10 shows a protocol stack 1004c that can be employed by device 54c-1 and a pair of protocol stacks 1008c that can be employed by node 74c, and a pair of protocol stacks 1006c that can be employed by server 900c.

Stack 1004c thus comprises an Internet Protocol ("IP") layer 1012c; a UDP layer 1016c; a datagram transport layer security ("DTLS") layer 1020c; at least one additional layer 1024c; and an application layer 1032c. (Again, in other embodiments at least one additional layer 1024c can be omitted).

IP layer 1012c, TCP layer 1016c and DTLS layer 1020c are all native protocols to Internet 70c, and thus those skilled in the art will recognize that collectively, IP layer 1012c, TCP layer 1016c and DTLS layer 1020c comprise at least one native network layer 336c, which is native and/or complementary to Internet 70c.

Again, at least one additional layer 1024c are all native protocols to node 74c and/or handler 82c and/or server 90c. The at least one additional layer 1024c can be, though need not be, substantially the same as, or comprised of, any additional layers used to implement server 118c, to thereby allow harmonization of the at least at least one additional layers 1024c used by both node 74c and server 118c.

Application layer 1032c contains data corresponding to the relevant application being accessed by device 54c-1 on application server 90c.

In a present embodiment, server 900c is configured to operate using stacks 1006c. The left side of stacks 1006c comprises an IP layer 1036c complementary to IP layer 1012c; a UDP layer 1040c complementary to UDP layer 1016c; and a DTLS layer 1044c complementary to DTLS layer 1020c. Layers 1036c, 1040c and 1044c are thus, collectively, directly complementary to at least one network layer 336c.

Stack 1006c also includes an upper layer relay 1044c which passes through at least one additional layer 1024c and layer 1032c without any handling or inspection.

The right side of stacks 1006c also includes a TCP layer 1060c that is complementary to a TCP layer 1070c of stacks 1008c. The right side of stacks 1006c also includes an IP layer 1037c that is complementary to IP layer 1066c of stacks 1008c.

The left side of stacks 1008c, used by node 74c, includes IP layer 1066c which is complementary to IP layer 1037c, and TCP layer 1070c which is complementary to TCP layer 1060c. Stacks 1008c also includes an upper layer relay 1076c cooperative with upper layer relay 1044c to pass through layers 1024c and 1032c.

The rights side of stacks 1008c reflects layers which are complementary to handler 82c and used for communication with handler 82c via link 86c. Thus, in a present embodiment, in stacks 1008c, the right side of stacks 1008c includes a UDP layer 1090c and an IP layer 1067c.

Those skilled in the art will now recognize that DTLS layer is based on TLS (transport layer security), a variant of SSL (secure socket layer), and is capable of datagram transport. The DTLS/UDP approach for stack 1004 can be more suitable for delay sensitive applications and can offer better scalability, in some circumstances, than the SSL/TCP approach in stack 304a and stack 304b. Also, server 900c effectively serves as an equivalent to the TCP aggregator server in system 50b. The upper layer relay 1044c can maintain the DTLS session with device 54c-1 and pass packets from layers 1024c and/or 1032c to node 74c.

While the foregoing describes certain embodiments, it should be understood that variations, combinations, and/or subsets thereof are contemplated.

The invention claimed is:

1. A system for sending and receiving packets comprising:
   a wireless communication device configured to communicate by sending and receiving packets over a wireless local area network;
   at least one device access node configured to communicate with said wireless communication device via an access point of said wireless local area network;
   an application server configured to communicate with said at least one device access node via a link; and,
   said wireless communication device configured to use at least one native network layer to communicate with said device access node; said at least one native network layer corresponding to network layers native to said wireless local area network;
   said wireless communication device further configured to use at least one additional layer disposed above said at least one native network layer to communicate with said application server via said device access node; said at least one additional layer corresponding to layers native to said device access node; and
   said wireless communication device is further configured to communicate over a core mobile network and said at least one device access node is configured to communicate with said wireless communication device via either said wireless local area network or said core mobile network; said wireless communication device being further configured to use at least one additional native network layer; said at least one additional native network layer corresponding to layers native to said core mobile network.

2. The system of claim 1 where said at least one native network layers include an Internet protocol ("IP") layer and a transport control protocol ("TCP") layer.

3. The system of claim 2 wherein said at least one native network layers further comprises a secure socket layer ("SSL").

4. The system of claim 1 wherein said at least one additional layer includes at least one layer that is unique to said device access node.

5. The system of claim 1 further comprising a service access handler between said application server and said device access node.

6. A method for sending and receiving packets comprising:
   determining which of a plurality of radios in a wireless communication device is active;
   each of said radios configured for sending and receiving packets via different links, wherein one of said links is a wireless local area network having an access point and a second one of said links is a core mobile network;
   selecting at least one native network layer to communicate with a device access node via an selected link of said different links;
   said at least one native network layer corresponding to one or more protocol layers that are native to said selected link;
   selecting at least one additional layer to communicate with an application server connected to said device access node and via said device access node;
   said at least one additional layer corresponding to one or more protocol layers that are native to said device access node; and,
   layering packets associated with an application on said application server above said selected at least one native network layer and said at least one additional layer.

7. The method of claim 6 wherein one of said links is said wireless local area network and said at least one native network layers for said wireless local area network includes an Internet protocol ("IP") layer and a transport control protocol ("TCP") layer.

8. The method of claim 7 wherein said at least one native network layers further comprises a secure socket layer ("SSL").

9. The method of claim 8 wherein said at least one additional layer includes at least one layer that is unique to said device access node.

10. The method of claim 9 further comprising a service access handler between said application server and said device access node.

11. A wireless communication device comprising:
   a radio for sending packets to at least one device access node over a wireless local area network via an access point of said wireless local area network;
   a second radio for sending packets to said at least one device access node over a core mobile network, said at least one device access node configured to communicate with said wireless communication device via either said wireless local area network or said core mobile network;
   a processor connected to said radio and said second radio and configured to select at least one native network layer;
   said at least one native network layer corresponding to at least one protocol layer that is native to said wireless local area network or said core mobile network;
   said processor further configured to select at least one additional layer that is native to said device access node; and,
   said processor further configured to layer an application above said at least one native network layer and said at least one additional layer; said processor further configured to send packets constructed according to said layers to said device access node; said application destined for an application server connected to said device access node.

12. The wireless communication device of claim 11 where said at least one native network layers include an Internet protocol ("IP") layer and a transport control protocol ("TCP") layer.

13. The wireless communication device of claim 12 wherein said at least one native network layers further comprises a secure socket layer ("SSL").

14. The wireless communication device of claim 11 said at least one additional layer includes at least one layer that is unique to said device access node.

15. The wireless communication device of claim 11 wherein a service access handler is disposed between said application server and said device access node.

16. A device access node comprising:
- a network interface for receiving packets from a wireless communication device via an access point of a wireless local area network and via a core mobile network; said packets structured according to:
  - at least one native network layer that corresponds to at least one protocol layer that is native to said wireless local area network and at least one protocol layer that is native to said core mobile network;
  - at least one additional layer;
  - an application layered above said at least one native network layer and said at least one additional layer;
- a processor connected to said network interface configured to receive packets therefrom; said processor configured to restructure said packets by replacing said at least one native network layer with at least one additional layer that corresponds to infrastructure disposed between an application server to which said application is destined and said network interface.

17. A non-transitory computer readable medium storing a plurality of programming instructions; said programming instructions executable on a wireless communication device; said instructions corresponding to a method for sending and receiving packets comprising:
- determining which of a plurality of radios in a wireless communication device is active;
- each of said radios configured for sending and receiving packet via different links, each of said radios configured for sending and receiving packets via different wireless links, wherein one of said links is a wireless local area network having an access point and a second one of said links is a core mobile network;
- selecting at least one native network layer to communicate with a device access node via a selected link of said different links an access said at least one native network layer corresponding to one or more protocol layers that are native to said selected link;
- selecting at least one additional layer to communicate with an application server connected to said device access node and via said device access node; said at least one additional layer corresponding to one or more protocol layers that are native to said device access node; and,
- layering packets associated with an application on said application server above said selected at least one native network layer and said at least one additional layer.

18. A system for sending and receiving packets comprising:
- a wireless communication device configured to communicate by sending and receiving packets over a wireless local area network via an access point of said wireless local area network and via a core mobile network;
- at least one device access node configured to communicate with said wireless communication device via said wireless local area network and said core mobile network; an application server configured to communicate with said at least one device access node via a link; and,
- said wireless communication device configured to use at least one native network layer to communicate with said device access node; said at least one native network layer corresponding to network layers native to said wireless local area network and network layers native to said core mobile network; and,
- said wireless communication device further configured to use at least one additional layer above said at least one native network layer to communicate with said application server via said device access node, said at least one additional layer corresponding to layers native to said device access node.

* * * * *